United States Patent [19]
Becker et al.

[11] Patent Number: 5,339,354
[45] Date of Patent: Aug. 16, 1994

[54] SHARED LINE TELEPHONE ANSWERING DEVICE

[76] Inventors: James F. Becker, 7735 Overlake Dr. W.; Andrew S. Mayer, 9421 Lake Washington Blvd., NE., both of Bellevue, Wash. 98004

[21] Appl. No.: 671,504

[22] Filed: Mar. 19, 1991

[51] Int. Cl.⁵ .................. H04M 1/65; H04M 3/50
[52] U.S. Cl. ........................ 379/67; 379/73; 379/77; 379/88; 379/95; 379/182
[58] Field of Search .......... 379/67, 88, 89, 73, 379/77

[56] References Cited
U.S. PATENT DOCUMENTS

| | | | |
|---|---|---|---|
| 4,788,714 | 11/1988 | Hashimoto | 379/102 |
| 5,056,132 | 10/1991 | Coleman et al. | 379/88 |
| 5,086,458 | 2/1992 | Bowen | 379/180 |

OTHER PUBLICATIONS
Command Communications Inc.

Primary Examiner—Thomas W. Brown
Assistant Examiner—Fan Tsang
Attorney, Agent, or Firm—Lewis Anten

[57] ABSTRACT

For a single telephone line having plural telephone answering devices (TADs) connected to it, a system of TADs is disclosed where only one TAD answers the telephone but all other TADs connected to the telephone line are accessible and activated by means of tones transmitted over the telephone line by the caller. The caller is notified by the answering TAD of the available tone codes which are then used to select the desired TAD. When a TAD is selected by means of tones, the first TAD is temporarily disconnected from the telephone line so that message privacy is maintained.

13 Claims, 7 Drawing Sheets

SHARED LINE TELEPHONE ANSWERING DEVICE

BACKGROUND OF THE INVENTION

1. Field of the Invention

This invention relates to telephone answering devices and more particularly to a telephone system where multiple answering telephone devices can be used on a single telephone line.

2. Description of the Prior Art

Telephone answering devices are well known in the art and have been used for many years. A typical telephone answering device, also known as a TAD, consists of a prerecorded outgoing message tape and an incoming caller message tape. Recently, telephone systems have been developed allowing the caller to input touch tones to have their calls directed to different recordings or personnel, or to perform different TAD functions such as to play back recorded messages from prior callers over the telephone line.

In U.S. Pat. No. 4,625,079 to Castro, issued on Nov. 25, 1986, circuitry is disclosed for the selective switching of certain devices, including a telephone answering device, by the caller. The Castro device includes a synthetic voice greeting by which a caller may be directed to input a code in order to activate different devices, including a message recording device. However, the Castro device does not employ a standard TAD, such as currently used by millions of households, as the responding unit, but employs a specific synthetic voice activation unit that directs the caller to enter a code to have a message recorded by a separate caller recording unit. The caller, if aware of the access codes of other devices, enters the access code to control such other device, such as the lights. The Castro system is not capable of using a preexisting TAD already owned by the owner of the system.

Further, the Castro device is complicated for a caller to use. Typically, a caller expects to hear a prerecorded message telling the caller to leave a message. In the Castro device, if the caller does not enter the requested code, no message will be recorded.

In the patent to Eswaran, U.S. Pat. No. 4,847,889, issued Jul. 11, 1989, a telephone answering device is disclosed that can have plural outgoing and incoming messages on a single telephone answering device. Different messages are not stored or recorded on separate TADs.

Other patents have also been reviewed. These include: Jackson's PHONE-LINE-LINKED, TONE-OPERATED CONTROL DEVICE, U.S. Pat. No. 4,596,900, issued on Jun. 24, 1986; and Hood et al.'s v/VOICE MAIL SYSTEM ON MAGNETIC TAPE, U.S. Pat. No. 4,747,126, issued May 24, 1988. Both of these inventions also rely on complex circuitry in order to achieve the ends of message direction.

Previously, if a number of TADs had been connected to a single telephone line, there would have been great confusion as all the TADs on the same line would pick up the ringing signal, deliver their messages at the same time, and then all the TADs would record the caller's message. Not only would the cacophony of several outgoing messages have to be endured by the caller, but there would be no privacy regarding the message the caller left. Each TAD on the line would have all the messages and the owner/user of each TAD would know what all the other messages were. This arrangement is obviously not satisfactory.

There exist situations where it would be convenient or necessary to have more than one telephone answering device on a single telephone line. Even in the smallest household, there is a significant demand for at least some privacy. Parents especially recognize this for their children. Roommates also benefit from the respect of the other's privacy. The same is true with business persons of perhaps different trades or professions sharing the same office space.

The problem of having multiple TADs is solved by having multiple telephone lines. However, this is not a convenient or economical solution. The need for a separate TAD may be temporary, or would not justify the expense of a second telephone line. It would also be desirable to be able to use existing TADs thereby greatly reducing both the cost of having multiple TADs and the cost of achieving the overall effect of the system.

The prior art has not addressed this situation in an inexpensive and simple manner. As disclosed herein, the present invention provides simple and inexpensive means by which a plurality of TADs may be used on a single telephone line, where messages may be left on only one telephone answering device connected to a single telephone line shared by many telephone answering devices. Further, existing TADs may be used in the system and no rewiring or reconfiguration is required, save the availability of telephone jacks.

SUMMARY OF THE INVENTION

The present invention provides for the connection of several telephone answering devices to one single telephone line. As such, a single telephone line may be shared by several parties, but each party can have an individual TAD connected to the shared telephone line and have the same privacy as if each individual TAD were connected to its own telephone line.

The system consists of a "master" TAD (or MTAD), an adapter module for the MTAD, and at least one "extension" TAD (or ETAD). The MTAD responds to incoming ring signals and is disconnected from the phone line by the MTAD adapter module. The ETAD or ETADs also connected to the phone line act as private TADs having private outgoing messages and recording means for recording messages not intended for the MTAD or other ETADs.

The MTAD can be a conventional TAD already in use in the household. Having a conventional TAD as the MTAD permits the use of what may already be an expensive TAD having many features such as remote message retrieval, call forwarding or signalling, etc. If the MTAD is a conventional TAD, then the MTAD is connected to the telephone line through an adapter unit which is connected to the telephone wall jack. Alternatively, the adapter unit can be incorporated directly into new TADs, eliminating the need for a separate adaptor unit.

The ETADs are connected to other telephone wall jacks of extension telephones in other rooms of the house that share the same telephone line as the MTAD. For any one telephone line, only one MTAD is needed, but several ETADs may be coupled to the telephone line.

Telephones may be connected to the telephone line through both MTADs or ETADs, an arrangement currently in common use with normal TADs. In all cases, ring signals are originally passed on through the MTAD, ETAD, or normal TAD, allowing a connected telephone to ring.

The ETADs ignore any incoming ring signals, but the MTAD responds to and becomes active upon reception of incoming ring signals. When the MTAD responds to the incoming ring signals, a prerecorded message is given to the effect that the caller's message may be left on the MTAD at the beep tone, or if the caller so desires, his or her message may be left exclusively on one of the other ETADs by pressing certain buttons on a the caller's touch tone telephone, such as the sequence "*1" or "#2".

In the preferred embodiment, each of the ETADs have their own prerecorded outgoing message. However, each such ETAD need not have an outgoing message capability. The ETADs include circuitry that detects and responds to certain touch tones transmitted over the telephone lines. In response to the appropriate touch tone code, the ETAD plays back its outgoing pre-recorded message and records the incoming message left by the caller. If the caller wants to leave a message on the MTAD, no touch tones would be entered by the caller and the operation by the user is exactly the same as with a conventional TAD, by default.

With the activation of an ETAD, the MTAD adapter module temporarily disconnects the MTAD so that the MTAD does not also receive the incoming message of the caller. For example, in the "*1" and "#2" examples above, the adapter module for the MTAD would respectively respond to either the "*" or "#" portions of the tone sequence, wait for a second tone, then temporarily disconnect the MTAD for a sufficient period of time to allow the MTAD to reset. After this time interval and MTAD reset, the adapter module then reconnects the MTAD to the telephone line in order for the MTAD to be in position to receive the next call. In this way, messages intended for an ETAD are not inadvertently recorded by the MTAD.

Alternatively, the prefix tone can activate the MTAD adapter module while two tones are required to activate an ETAD.

The MTAD adapter module monitors the telephone line for telephone signals. Upon detection of the correct tone codes, the MTAD adapter module temporarily disconnects the telephone connection to the MTAD. A tone decoder present in the MTAD adapter module detects preset tone signals, then signals a timer to activate a disconnection switch. During the timer's cycle, the disconnection switch opens and disconnects the MTAD from the telephone line.

Preferably, upon receiving an appropriate tone prefix, all ETADs temporarily connect to the telephone line. Reception of the appropriate suffix tone activates one ETAD while the others maintain their connection for a short period of time, or drop the connection altogether upon detecting an invalid suffix tone. After the time period has expired, the ETADs not selected drop their connections. This ETAD behavior preserves the telephone connection as the disconnection of the telephone line by the adapter module could possibly disconnect the caller entirely and prevent the recording of any message. Disconnection of the MTAD from the telephone line by the adapter module is accompanied by the connection of ETADs to the telephone line to preserve the incoming call. Maintenance of the telephone call connection is thereby transferred from the MTAD to a specific ETAD.

OBJECTS OF THE INVENTION

Accordingly, it is an object of this invention to provide a system by which multiple telephone answering devices may be connected to a single telephone line without interfering with one another.

It is also an object of the present invention to provide a telephone answering system for use of multiple TADs on a single telephone line that is economical.

It is yet another object of the present invention to provide a telephone answering system for use of multiple TADs on a single telephone without having to replace existing TADs.

It is a further object of the present invention to provide a telephone answering system for having multiple TADs on a single telephone line that is reliable.

It is also an object of the present invention to provide a telephone answering system which is easy to use and can be attached through any telephone jack.

It is yet another object of the present invention to provide a telephone answering system that can be easily applied to existing single line home telephone wiring and that requires no additional downstream wiring or attachments.

These and other objects of the present invention will be apparent from a review of the accompanying specifications and drawings.

DESCRIPTION OF THE PREFERRED EMBODIMENTS

Throughout this disclosure, reference is made to both telephone lines and telephone cables. A distinction is intended between an access line, such as for a house or home, to a central telephone system having a single telephone number and connection wires or cables that connect extensions to that single access line. The access line is referred to as a telephone line and the connections to the access line are referred to as telephone cables.

Figure 1:
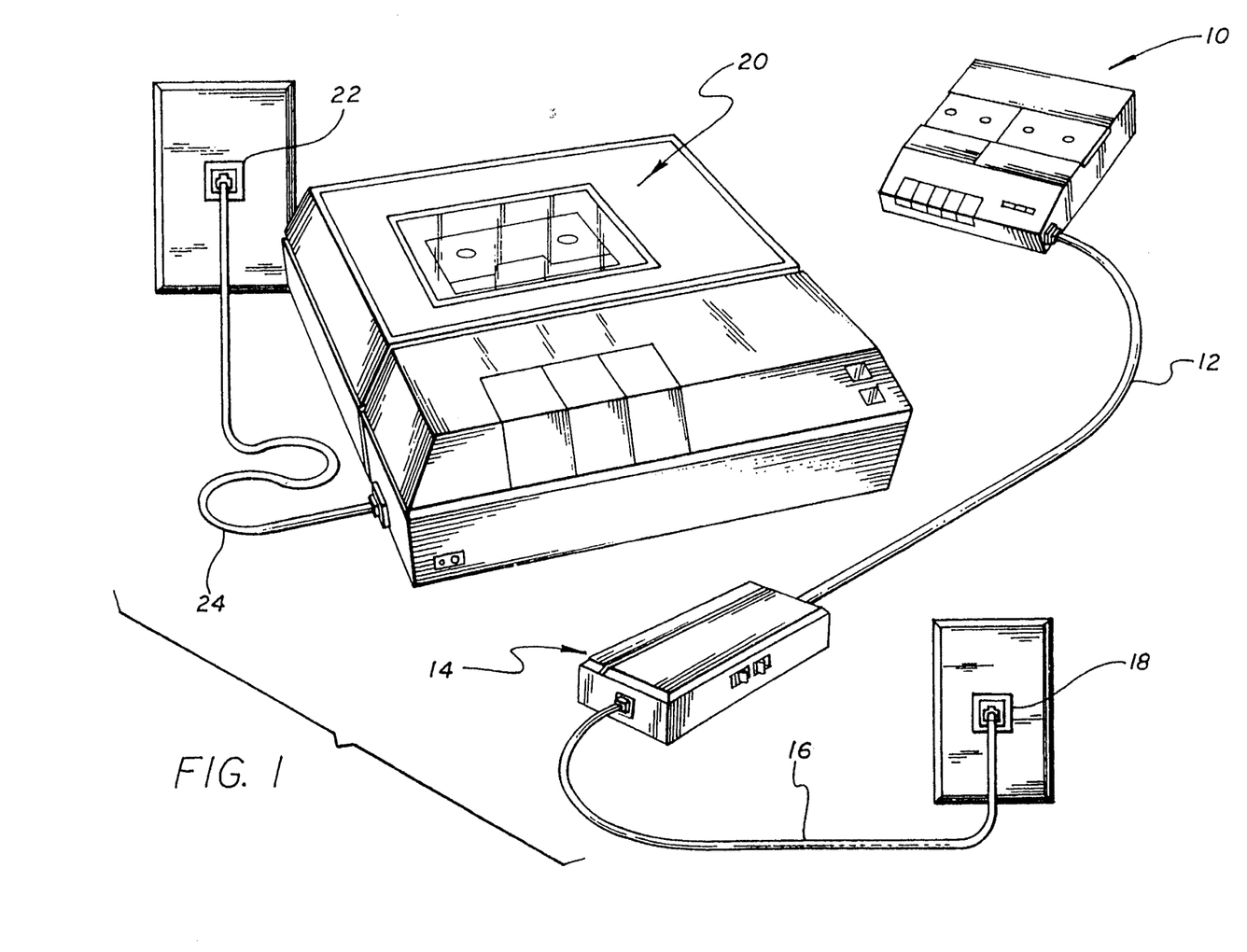
FIG. 1 shows the system of the present invention on a single telephone line shared by a master TAD, an extension TAD, and an adapter module.
Figure 2:
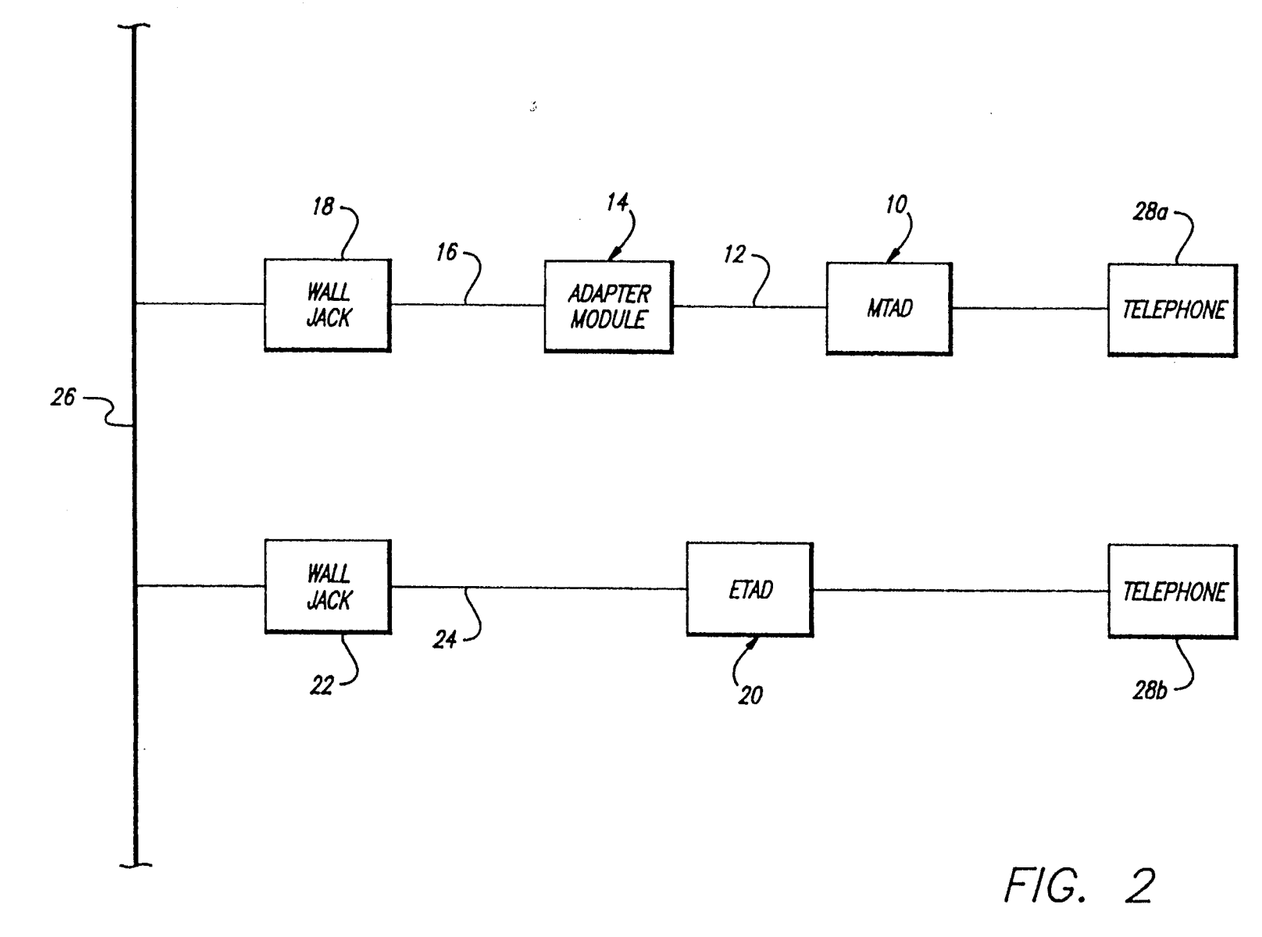
FIG. 2 shows a basic schematic diagram of the inventive system.

Referring to FIGS. 1 and 2, the system of the present invention is shown. A master TAD, or MTAD 10, having means for recording and playing back an outgoing message, and means for recording and playing back incoming messages from a caller, is connected by a telephone cable 12 to an external MTAD adapter module 14. The adapter module 14 may be built in the same housing as the MTAD 10. The MTAD adapter module 14 is connected by telephone cable 16 to the wall jack 18. An extension TAD, or ETAD 20, for recording and playing back an incoming message is connected to a separate wall jack 22 by another telephone cable 24. Wall jacks 18 and 22 are connected to a telephone line 26 provided by a telephone utility company to provide access to a telephone network. More ETADs 20 may be present and connected to other wall jacks at other locations, sharing the same telephone line 26. Components and connections of plural ETADs 20, such as by telephone cables 24, are referred to in this description by references to a single ETAD 20.

The MTAD 10 may be a conventional, ring-activated telephone answering device having two different recording and play back means, typically tape recorders using audio tape. One recording means is for recording and playing back a prerecorded outgoing message and the other recording means is for recording and playing back the caller's incoming message. The MTAD 10 has several switches for function control of the outgoing and incoming message tapes and may have numerous other features, such as remote calling etc., presently available on higher priced TADs.

The MTAD 10 answers calls after ring signals have been sequentially detected a certain number of times. The MTAD 10 then plays an outgoing message to the caller, and may then record the caller's message. A telephone 28a may be coupled to the telephone line 26 through the MTAD 10. Likewise, a telephone 28b may be coupled to the telephone line 26 through the ETAD 20.

Figure 3:
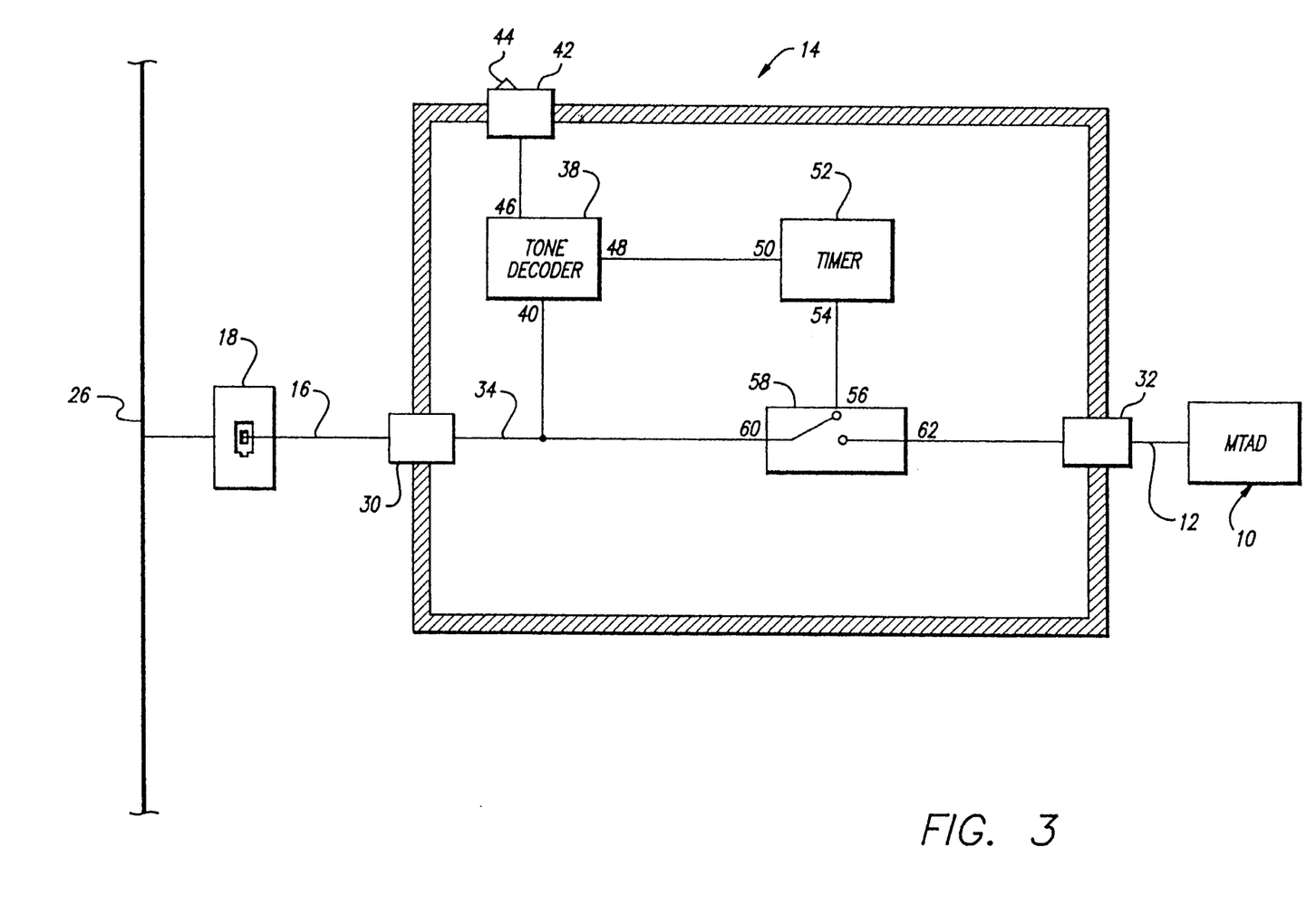
FIG. 3 shows a schematic diagram of an adapter module for the master TAD.

As shown in FIG. 3, the MTAD adapter module 14 comprises an input connection 30 to receive telephone cable 16, and an output connection 32 connected to MTAD 10 by telephone cable 12. The MTAD adapter input 30 is connected to the adapter output 32 by the internal telephone cable 34. The MTAD adapter module 14 is serially connected between the telephone cable 16 and the MTAD 10.

A tone or DTMF (Dual Tone Multi-Frequency) decoder 38 is connected at an input 40 to the internal telephone cable 34. A tone selector switch 42 with a position knob 44 is connected to a second input 46 of the tone decoder 38. The output 48 of tone decoder 38 is connected to the input 50 of the timer 52. The timer 52 may be one that is generally known in the art as a 555. The output 54 of timer 52 is connected to the input 56 of the disconnection relay 58. The disconnection relay 58 is serially connected across the internal telephone cable 34. The disconnection relay 58 has one side 60 connected to the adapter input 30 and has the other side 62 connected to the adapter output 32. A power supply (not shown) supplies power to the tone decoder 38, timer 52, and disconnection relay 58.

The tone decoder 38 monitors telephone signals transmitted over the connected internal telephone cable 34. When the tone decoder 38 detects the tone as selected by tone selector switch 42, the tone decoder 38 is alerted that it may become engaged upon detection of a tone immediately following the first detected and preselected tone. It may be that the preselected tone is not immediately followed by a second tone, or that too much time elapses between the first and second tones. If so, the tone decoder 38 resets and begins to check the internal telephone cable 34 for the first preselected tone again.

If the tone decoder 38 does indeed detect a second tone immediately following the appropriate prefix tone, the tone decoder 38 then engages and transmits an activation signal via its output 48 to the input 50 of timer 52.

Upon reception of the activation signal from tone decoder 38, timer 52 in turn engages and transmits another activation signal. The activation signal of timer 52 is continuously transmitted from its output 54 to the input 56 of disconnection relay 58 for the duration of the timer 52 cycle. Preferably, the duration of timer 52 cycle is on the same order as the outgoing message length.

The disconnection relay 58 is normally closed, allowing signal communication between the adapter input 30 and the adapter output 32 along the internal telephone cable 34. Upon reception of the activation signal from the timer 52, the disconnection relay 58 opens and breaks the connection between the adapter input 30 and the adapter output 32 along the internal telephone cable 34. The disconnection relay 58 remains open so long as it receives an activation signal from the timer 52. When the timer 52 ceases emitting its activation signal, the disconnection relay 58 closes and re-establishes the connection between the adapter input 30 and the adapter output 32 along the internal telephone cable 34. The disconnection relay 58 controls the connection of a telephone call between telephone line 26 and the MTAD 10, and if present, the telephone 28a.

The broken connection created by the disconnection relay 58 serves to temporarily disconnect and uncouple both MTAD 10 and telephone 28a from the telephone line 26. As will be explained below, this temporary disconnection of the MTAD 10 from the telephone line 26 is an important feature of the inventive system as it maintains call privacy to an ETAD 20 chosen by the caller.

Figure 4:
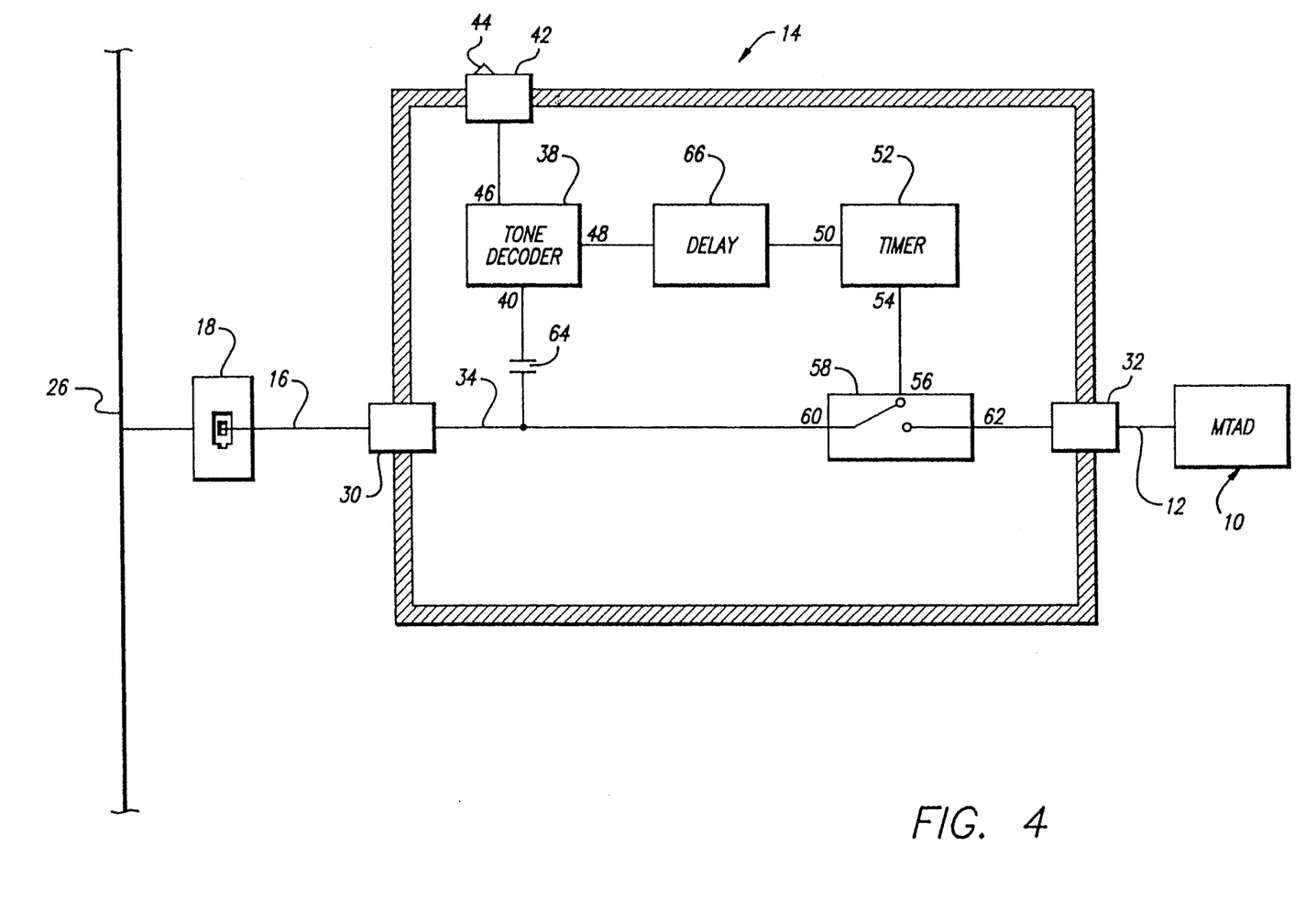
FIG. 4 shows a schematic diagram of an alternative embodiment of an adapter module for the master TAD.

FIG. 4 shows an alternative embodiment of the MTAD adapter module 14. In FIG. 4, an AC coupling capacitor 64 is serially connected to and between the input 40 of tone decoder 38 and the internal telephone cable 34. Also, a delay circuit 66 may be serially connected between the tone decoder 38 and the timer 52 so that the output signal sent by the decoder 38 to activate the timer 52 is slightly delayed. This delay is preferably on the order of one-half second, but may be adjusted to fit specific needs.

In a third embodiment, the MTAD adapter module 14 may activate and disconnect the MTAD 10 upon detection of a single tone.

These and other embodiments of the MTAD adapter module 14 may be incorporated into the MTAD 10. Further, such an MTAD incorporated adapter module may be switchably controlled so that the user may choose between various modes of operation. It is contemplated that circuitry further incorporated into a TAD may switchably allow it to function as a normal TAD, an MTAD with an incorporated adapter, or, as explained later, an ETAD with incorporated tone detection and response circuitry.

Figure 5:
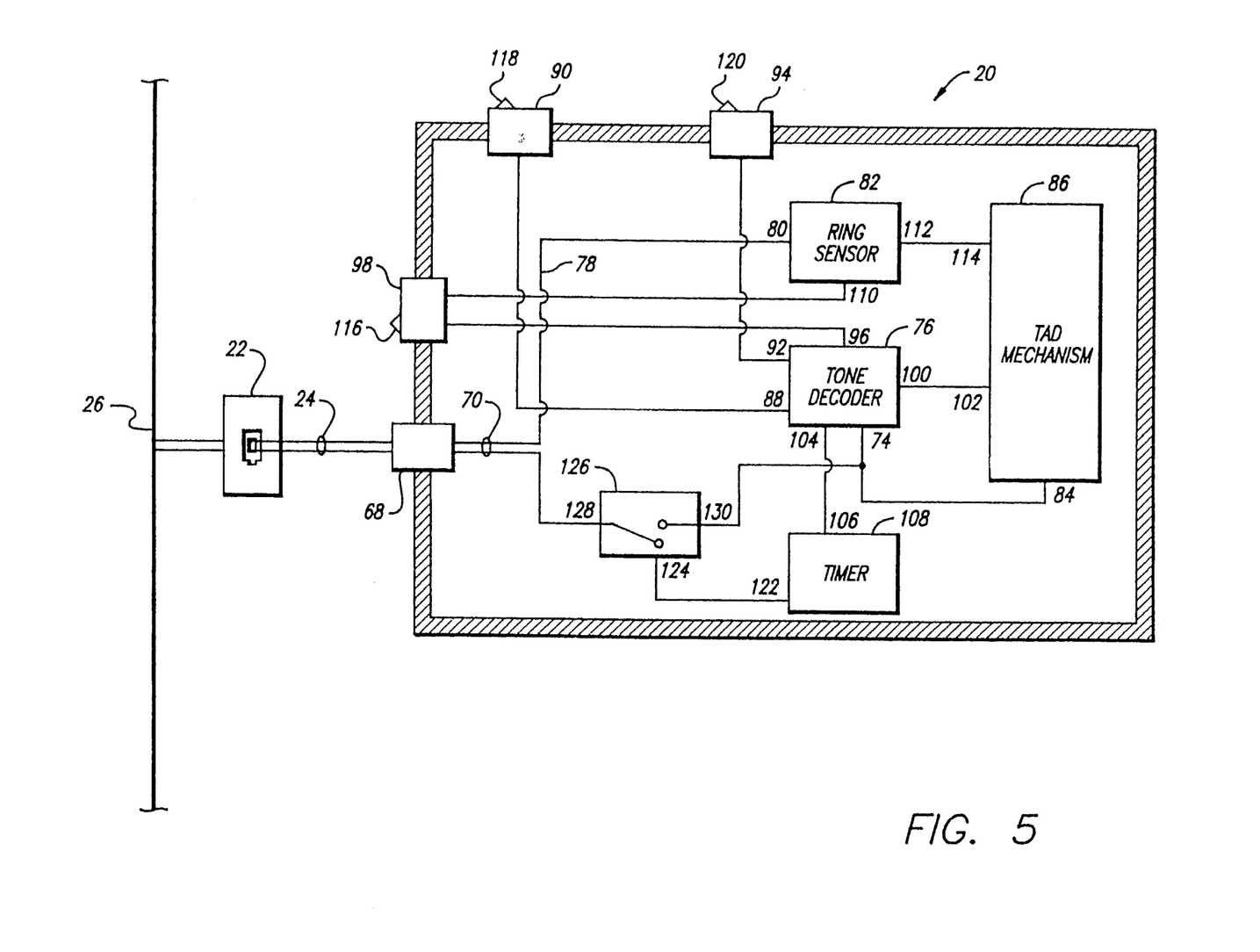
FIG. 5 shows a schematic diagram of one embodiment of the extension TAD, or ETAD.

As shown in FIG. 5, the input 68 of the ETAD 20 is connected to the telephone cable 24, which couples the ETAD 20 to the telephone line 26 through the wall jack 22. The ETAD telephone input 68 is also connected to the internal telephone cable 70, coupling it to the telephone cable 24. The ETAD telephone input 68 is coupled by internal telephone connection wire 70 to the telephone input 74 of the tone decoder 76 and connected by an internal telephone wire 78 to the telephone input 80 of the ring signal sensor 82.

The tone decoder 76 has four inputs. The tone decoder 76 has a telephone input 74 connected to ETAD input 68 by the internal telephone cable 70. The tone decoder 76 has a first tone switch input 88 connected to the prefix tone selection switch 90. The tone decoder 76 also has a second tone switch input 92 connected to the suffix tone selection switch 94. The tone decoder 76 has an enable/disable input 96 connected to an enable/disable switch 98.

The tone decoder 76 has two outputs. The activation output 100 is connected to the tone decoder input 102 of the TAD mechanism 86. The timer output 104 is connected to the input 106 of the timer 108.

The ring signal sensor 82 has two inputs. The ring signal sensor 82 has a telephone input 80 coupled to the ETAD input 68 through internal telephone cable 78. The ring signal sensor 82 has an enable/disable input 110 connected to the enable/disable switch 98. The ring signal sensor 82 has one output 112 connected to the ring signal sensor input 114 of the TAD mechanism 86. It may be possible to unite tone decoder output 100 and ring signal sensor output 112 to feed one single cassette mechanism input, especially if the see signals are emitted by both the tone decoder 76 and the ring signal sensor 82.

The TAD mechanism 86 has at least one recording means for recording and playing back the caller's incoming message and may also have means for recording and playing back an outgoing message. The TAD mechanism 86 serves as the telephone answering device part of the ETAD. The TAD mechanism 86 is coupled to the telephone line 26 through its inputs 102, 114 and its output 84 by internal telephone cable 70.

An enable/disable switch 98 with position knob 116 is connected to both the tone decoder 76 and ring signal sensor 82 through their respective inputs 96 and 110.

Two tone selection switches 90 and 94 are connected to the tone decoder 76 through tone decoder inputs 88 and 92, respectively. The tone selection switches 90 and 94 each have position knobs 118 and 120, respectively.

The timer 108 is connected at its input 106 to the output 104 of tone decoder 76- The output 122 of timer 108 is connected to the input 124 of the connection relay 126.

The connection relay 126 is connected at both ends 128, 130 to the internal telephone cable 70. The connection relay is also connected by its input 124 to the output 122 of timer 108.

Having described the overall structure of the ETAD 20, its functioning is explained below.

The tone decoder 76 monitors the internal telephone cable 70 for tone signals. The tone signals for which the tone decoder 76 monitors the internal telephone cable 70 are determined by the tone selection switches 90 and 94. Upon receiving the appropriate prefix tone, the tone decoder 76 emits a signal through its timer output 104 to the input 106 of timer 108.

The signal received by timer 108 through its input 106 from the tone decoder 76 serves to activate the timer 108. The timer 108 then emits a signal from its output 122 for the duration of the time cycle of the timer 108. The output signal of timer 108 is transmitted to the input 124 of connection relay 126. Upon completion of its cycle, the timer 108 ceases to emit its output signal. The time cycle of the timer 108 may be adjusted according to needs or designs, but is preferably on the order of ten to twenty seconds.

The connection relay 126 is normally open. The timer output signal received by the connection relay 126 serves to close the connection relay 126 for the duration of the timer output signal. Closing the connection relay 126 serves to complete a connection within internal telephone cable 70. The connection within internal telephone cable 70 created by the connection relay 126 maintains an incoming telephone call connection for as long as the connection relay 126 is closed. When the timer 108 ceases emitting its output signal, the connection relay 126 opens and remains open until closed by another output signal from the timer 108.

Upon receiving the appropriate suffix tone immediately following the appropriate prefix tone, the tone decoder 76 emits a signal through its activation output 100 to the tone decoder input 102 of TAD mechanism 86.

Reception of an output signal from the tone decoder 76 activates the TAD mechanism 86. The TAD mechanism 86 closes a connection (not shown) that creates a connection within internal telephone cable 70 so that the telephone call may be maintained for the duration of the cycle of the TAD mechanism 86. Once the TAD mechanism 86 completes its cycle, the previously closed connection is re-opened to break the telephone call connection. After creating the connection within the internal telephone cable 70, the TAD mechanism 86 then plays a prerecorded outgoing message to the caller if such an outgoing message is present. Regardless of the presence of such an outgoing message, the TAD mechanism 86 then records the caller's incoming message on the means provided by the TAD mechanism 86 for that purpose.

In this way, the ETAD 20 records the caller's message when the ETAD 20 is activated by tones. These activating tones can be transmitted by the caller over a touch tone telephone. The activating tones allow a caller to activate one specific ETAD 20 even when several ETADs 20 may be coupled to the same telephone line 26.

The optional enable/disable switch 98 controls the alternative functioning of the ETAD 20. The enable/disable switch 98 allows the ETAD 20 to function either as a tone-activated ETAD or as a normal, ring-activated TAD. When the tone decoder 76 is enabled by the enable/disable switch 98, the tone decoder 76 is active and monitors the internal telephone cable 70 for tones while ring signal sensor 82 is disabled. Conversely, when the enable/disable switch 98 enables the ring signal sensor 82, the ring signal sensor 82 is active and monitors the internal telephone cable 78 for ring signals while the tone decoder 76 is disabled. Upon detection of ring signals or appropriate tones, the ring signal sensor 82 or the tone decoder 76 emit signals via their outputs to their respective inputs of the TAD mechanism 86. The TAD mechanism 86 is in turn activated and records the caller's message.

The activation of the TAD mechanism 86 by the ring signal sensor 82 is similar to activation by the tone decoder 76. When the ring signal sensor 82 detects a sufficient number of consecutive ring signals, it emits an activation tone from its output 112 to the TAD mechanism 86. In response thereto, the TAD mechanism 86 becomes active, just as for the tone decoder 76 activation signal.

The prefix tone selection switch 90 is connected to the first tone switch input 88 of the tone decoder 76. Position knob 118 of the first tone switch 90 allows the user to select between either the "*" or the "#" tones for the prefix tone. The suffix tone selection switch 94 is connected to the second tone switch input 92 of the tone decoder 76. Position knob 120 of the second tone switch 94 allows the user to select any of the ten numbers (zero through nine) present on a push button telephone pad as the suffix tone. Between the two tone selection switches, the ETA/3 user can control the code to which the ETAD 20 responds and can have 5 different tone codes for different ETADs.

Alternatively, touch tones may be used to select the prefix and suffix tones. The tone decoder 76 monitors the phone line for a certain tone sequence that allows the prefix and/or suffix tones to be set. Upon detecting the tone sequence, the tone following is accepted by the tone decoder 76 as the new prefix or suffix tone. Different tone sequences may be used for the prefix and the suffix tone codes. The touch tones may be entered from an extension phone on the line 26 to which the ETAD 20 is connected.

At least two tones are required for tone codes as the use of only one tone does not provide the necessary number of individual codes when several ETADs 20 are coupled to the telephone line 26. Further, the use of only one tone for a tone code would lead to confusion. For example, if a single number tone were used for ETAD 20 codes, an ETAD 20 might activate when calling a number from a telephone line with a connected ETAD 20. If only "*" and/or "#" were used for ETAD 20 tone codes, then only one or two ETADs 20 could be attached to the telephone line. By using a non-numeric tone prefix with a numeric tone suffix, the system prevents accidental activation of connected ETADs 20 and allows connection and use of several ETADs to the same telephone line 26.

A complication exists with the use of tones to activate ETADs 20. As ETADs 20 may be activated by tones on the telephone line 26, a person calling out from a telephone line with an attached ETA/3 20 has the same opportunity to activate the ETAD 20 as a person calling in. For example, when an outgoing call is made and tones are used by the caller to access another tone-controlled system, the tone codes for devices on the called side may be the same as ETAD codes on the calling side.

In order to avoid unintended activation of a local ETAD 20 when a "*" or "#" is used by the outgoing caller, an approximately five second "window" or "trap" circuit (not shown) may be added to the ETAD 20. This window allows only five seconds from the time the prefix tone is decoded until the suffix tone is decoded for tone codes to be recognized by the ETA/) 20. Once the five second time period has elapsed, a new tone code must be decoded by the ETAD 20 in order to activate the ETAD 20 with a tone code.

This window allows a caller to use the "*" or "#" keys when calling out, without unintentionally activating an ETAD 20. A five second separation must follow the "*" or "#" tone used by the outgoing caller to prevent ETAD 20 activation.

Permutations of the tone prefixes and suffixes allow for 20 different ETAD activating tone codes. However, the MTAD adapter module 14 may be switchably configured to activate upon only one of the two prefix tones. While this limits the number of effective tone codes to ten, ten codes should be sufficient for most households and small offices. MTAD adapter modules 14 with expanded activation code sets are a possible solution to this limitation.

Connection relay 126 serves to temporarily preserve the telephone line 26 connection when the prefix tone of a tone code is received and decoded by the ETAD 20.

In one embodiment, only one tone may be required by the MTAD adapter module 14 in order to disconnect the telephone cable 16 from the MTAD 10. The preferred embodiment of the ETAD 20 establishes a temporary telephone line connection in order to preserve the call when the MTAD adapter module 14 disconnects the MTAD 10. The connection relay 126 closes and establishes this temporary call-preserving connection with the telephone line 26 when the prefix of the two tone activating code is received by the tone decoder 76.

Figure 6:
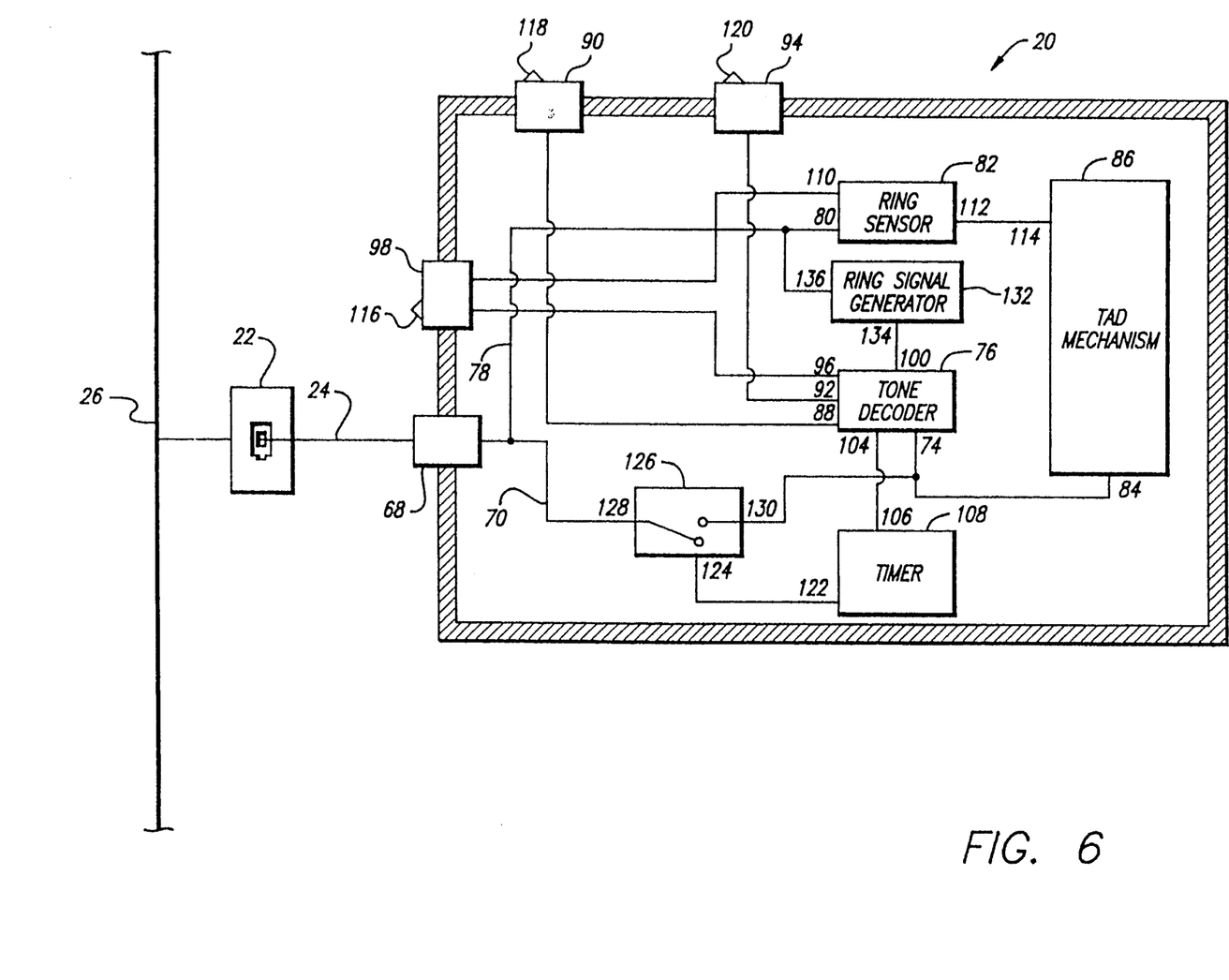
FIG. 6 shows a schematic diagram of an alternative embodiment of the ETAD.

As shown in FIG. 6, an alternative embodiment of the ETAD may be achieved by connecting a ring signal generator 132 between the tone decoder 76 and the internal telephone wire 78 that leads to the input 80 of ring signal sensor 82. The output 100 of the tone decoder 76 is connected to the input 134 of the ring signal generator 132. The tone decoder 76 has no direct connection with the TAD mechanism 86. That connection is substituted by the connection between the activation output 100 of the tone decoder 76 and the input 134 of the ring signal generator 132. The output 136 of the ring signal generator 132 is connected to the input 80 of the ring signal sensor 82.

In the alternative embodiment, when the tone decoder 76 is enabled and it detects the appropriate prefix tone, the tone decoder 76 first activates the timer 108 and connection relay 126. Upon detecting the appropriate suffix tone following the appropriate prefix tone, the tone decoder 76 emits an output signal through its activation output 100 and activates the ring signal generator 132. Upon activation, the ring signal generator sends ring signals to the ring signal sensor 82. The ring signal sensor 82 activates the TAD mechanism 86 when it receives sufficient consecutive ring signals from either the ring signal generator 132 of the ETAD 20 or from the coupled telephone line 26. When the TAD mechanism 86 is activated via the ring signal generator 132, the ring signal generator 132 ceases emitting ring signals when it senses the connection established by the TAD mechanism 86. One means by which the connection can be sensed is through the increased current through the circuit loop established by the connection.

It is possible to have a dedicated ETAD 20 without the ring signal sensor 82, but its use is more limited. As above for the MTAD 10, further circuitry may be incorporated into the ETAD 20 so that the circuitry present in the MTAD adapter module 14 is selectably accessible by the ETAD user. The device so constructed may be switchably controlled to perform the functions of a regular TAD, an ETAD 20, or an MTAD 10 with adapter module 14.

Preferably, the MTAD 10, MTAD adapter module 14, and ETAD 20 work together as follows:

If a telephone call is received from the telephone line 26 and the telephones 28a and 28b go unanswered, the MTAD 10 engages and plays back a prerecorded message after receiving a certain number of consecutive ring signals. The ETADs remain inactive and do not answer the telephone. The ETAD tone decoders 76 do not respond to the ring signals on the telephone cable for they require DTMF tones to become active. Upon connecting to the telephone line 26, the MTAD 10 plays its pre-recorded outgoing message, which might be as follows assuming there are two ETADs 20 on the telephone line. "Hi. If you would care to leave a message for Arthur, please press the star and then the number one on your telephone, now. If you would care to leave a message for Betty, please press the star and then the number two, now. If you would care to leave a message for Carl, please wait for the beep and then begin speaking. Thank you."

The caller would then either wait for the beep signal to leave a message for Carl on the MTAD 10, or push the star "*" and number "1" or "2" to leave a message for Arthur or Betty, respectively.

When an ETAD 20 is selected by the caller, the MTAD 10 is temporarily disconnected from the telephone line 26 in order to prevent the MTAD from recording of the caller's private message which is intended for a certain ETAD 20. In order to temporarily disconnect the MTAD 10 from the telephone cable 16, the MTAD adapter module severs the call connection. For this, the tone selector switch 42 of the MTAD adapter module 14 must be set to the appropriate prefix tone, in this case a "*". Once the tone decoder 76 of the MTAD adapter module 14 detects the "*" prefix tone, the MTAD adapter module 14 is alerted to the presence of a call and awaits another tone before executing the temporary disconnect sequence.

It does not matter what the following tone is as the MTAD adapter module 14 will assume that it is the appropriate suffix tone for an available ETAD 20. If the caller misdials and is disconnected, he/she may have to call back. However, as the ETADs 20 establish a temporary connection with the telephone line 26 upon reception of the prefix tone, the caller may have second, and maybe third, chances to fully activate a desired ETAD 20.

When the caller chooses to leave a message on an ETAD 20, the two-tone code serves as a means by which the telephone line 26 connection can be transferred from the MTAD 10/MTAD adapter module 14 pair to an ETAD 20. The prefix tone serves to alert the MTAD adapter module 14 that it is to begin the disconnection sequence upon reception of the next tone. The prefix tone also serves to temporarily connect all ETADs 20 sharing the telephone line 26 by means of their timers 108 and connection relays 126 and to alert them that a single one of them will be activated upon reception of the next tone.

Reception of the suffix tone by the MTAD adapter module 14 serves to disconnect the MTAD 10 from the established telephone connection. When the suffix tone is received by the appropriate ETAD 20, it is activated and begins the call recording sequence.

Other ETADs 20 that were not selected by the suffix tone stay connected to the telephone cable until the time programmed in their timers 108 has elapsed and their respective connection relays 126 reset in the open position. Alternatively, ETADs 20 that were not selected may drop their respective connections to the telephone cable upon detecting an invalid suffix tone. The ETAD 20 that detects a valid tone code sequence composed of both a proper prefix and a proper suffix would then have an exclusive connection to the telephone call.

As mentioned above, the ETAD 20 may play its own outgoing message in addition to the one played by the MTAD 10 and then record the caller's message, or the ETAD 20 may just record incoming messages without delivering an outgoing message.

The operation of the MTAD/ETAD system is the same as any other TAD. Even if the caller ignores the instructions, the caller will still hear the record tone on the MTAD and will be able to leave a message. This is significant since many people do not pay attention to the prerecorded message or may be confused by the instructions or forget the instructions. However, unlike the Castro device mentioned previously, once the caller hears the familiar record tone the caller can leave a message.

If the caller wishes to leave a message on an ETAD 20 and he/she has already heard the outgoing message from the MTAD 10 or knows the code, the caller may enter the tone code without waiting for the message to end. The MTAD adapter module 14, and the ETAD 20, will activate even during the playing of an outgoing message, increasing the convenience and utility of the present invention.

As can be seen by the foregoing, an advantage of the shared telephone line answering system lies in the fact that each telephone answering device sees itself as the only device on the telephone line. The ETADs 20 wait for appropriate tone signals on the telephone cable 24, then become active when those signals are detected. Through the use of tones, the caller selects the ETAD 20 of choice and then proceeds to leave the message on it. Only the MTAD 10 initially answers the incoming call and may record the caller's message by default or may be temporarily disconnected from the telephone cable 16 to reset when an ETAD 20 is selected. The ETADs 20 "see" the incoming telephone cable 24 as continually silent until they are activated by the preselected tone sequence chosen for that ETAD 20. Upon activation, the ETAD 20 acts as if it were a regular TAD connected to a ringing telephone. The generation of an output signal by the tone decoder 76 to activate the TAD mechanism 86 is the means by which the ETADs 20 can be selected and activated by the caller.

Figure 7:
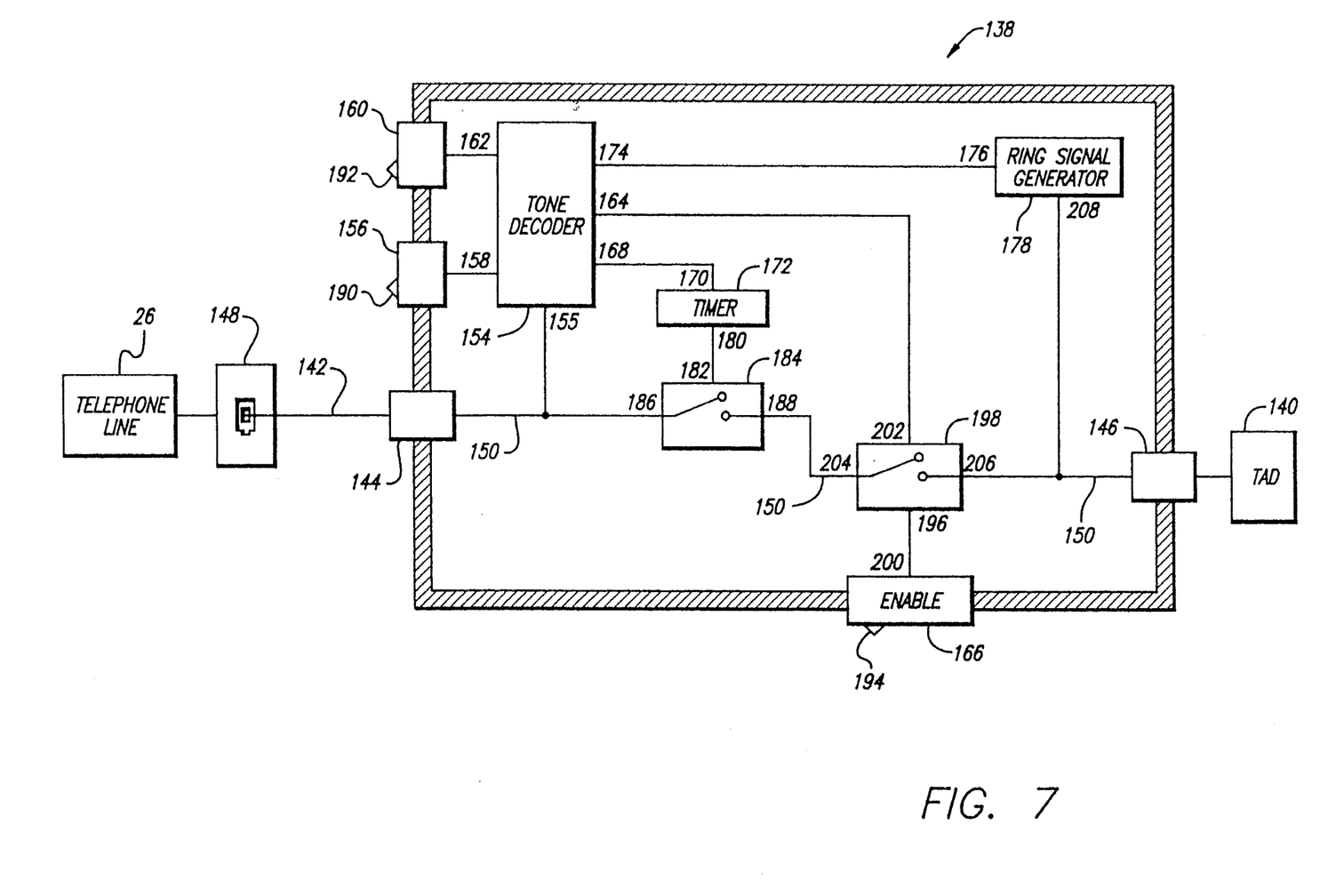
FIG. 7 shows a schematic diagram of the ETAD module.

The functional equivalent of the ETAD 20 may be constructed through the cooperative connection of a conventional TAD and an ETAD adapter module 138 containing the special tone detection and response circuitry described above.

As seen in FIG. 7, the ETAD module 138 is serially connected to and between the telephone cable 142 and a conventional TAD 140 by means of telephone cable connectors 144 and 146 at both ends. Telephone cable 142 is coupled to the telephone line 26 through wall jack 148. The cable connectors 144 and 146 are connected to each other by the internal telephone cable 150.

Within the ETAD module 138, a tone decoder 154 is connected at its input 155 to the internal telephone cable 150. A prefix tone selection switch 156 is connected to the first tone switch input 158 of the tone decoder 154. A suffix tone selection switch 160 is connected to the second tone switch input 162 of tone decoder 154. An enable/disable input 164 is present on the tone decoder 154 and is controlled by an enable switch 166. These are the four inputs of the tone decoder 154 of the ETAD adapter module 138.

The tone decoder 154 has two outputs. The timer output 168 is connected to the input 170 of the timer 172. The activation output 174 is connected to the input 176 of the ring signal generator 178.

The timer 172 is connected by its input 170 to the tone decoder 154. The output 180 of the timer 172 is connected to the input 182 of, and controls the status of, connection relay 184. Connection relay 184 is connected on both sides 186, 188 to the internal telephone cable 150.

The prefix tone selection switch 156 has a position knob 190 and is connected to the first tone switch input 158 of the tone decoder 154. The suffix tone selection switch 160 has a position knob 192 and is connected to the second tone switch input 162 of the tone decoder 154. Both tone selection switches 156 and 160 are accessible from the exterior of the ETAD adapter module 138.

The enable switch 166 has a position knob 194 and is connected to the input 196 of, and controls the status of, the bypass relay 198. The enable switch 166 is coupled to the enable/disable input 164 of the tone decoder 154 through the bypass relay 198. The enable switch 166 is also externally accessible from the exterior of ETAD adapter module 138.

The bypass relay 198 is connected to the output 200 of the enable switch 166 by its input 196 and is connected to the enable/disable input 164 of the tone decoder 154 by an output 202. The bypass relay 198 is serially connected to the internal telephone cable 150. One side 204 of the bypass relay 198 is connected to one cable connector 144 and the other side 206 is connected to the other cable connector 146.

Having described the overall structure and interconnections of the ETAD adapter module 138, the ETAD adapter module 138 functions as follows.

The tone decoder 154 monitors the internal telephone cable 150 for the appropriate prefix tone as set by the prefix tone selection switch 156. Upon detection of the appropriate prefix tone, the tone decoder 154 emits a signal from its timer output 168. The timer output signal is transmitted to the connected timer 172.

Upon detection of the appropriate suffix tone (as set by the suffix tone selection switch 160) immediately following the appropriate prefix tone, the tone decoder 154 emits a signal from its activation output 174. The activation output signal is transmitted to the connected ring signal generator 178.

Upon reception of the timer output signal from the tone decoder 154, the timer 172 emits a signal to the connection relay 184. The signal emitted by the timer 172 and transmitted to the connection relay 184 is continuous and lasts for the duration of the timer's cycle. The timer's cycle lasts about 15 seconds. After the timer 172 has executed its cycle, the timer 172 ceases emitting its output signal and may be activated again by another timer output signal from the tone decoder 154.

The connection relay 184 is normally open. Upon reception of the output signal from the timer 172, connection relay 184 closes for the duration of the signal from the output 180 of the timer 172. Closure of the connection relay 184 creates a call-maintaining connection that prevents the call from being disconnected. This connection is temporary as it lasts only so long the timer 172 emits its output signal. Connection relay 184 preserves the call during the interim while the MTAD 10 is being disconnected from the call by the MTAD adapter module 14 and the TAD 140 connected to the ETAD adapter module 138 is connecting to the call.

The ring signal generator 178 has an input 176 connected to the activation output 174 of the tone decoder 154. Upon reception of an activation signal from the tone decoder 154, the ring signal generator 178 emits ring signals from its output 208 to the internal telephone cable 150, and ultimately to the connected TAD 140. The TAD 140 detects the ring signals from the ETAD adapter module 138 and establishes a connection with the telephone cable 210 and the telephone line 26 coupled thereto. The ring signal generator 178 detects the connection and ceases to emit ring signals. The TAD 140 then answers the call as it normally would by playing an outgoing message (if present) to the caller and by recording the caller's message for later playback to the TAD's user. Telephone signals are passed through the circuit elements of the tone decoder 154 and the ring signal generator 178 so that a telephone connection is made.

The prefix tone selection switch 156 for the ETAD adapter module 138 functions similarly as the prefix tone selection switch 90 for the ETAD 20, above. The same is respectively true for the suffix tone selection switch 160 of the ETAD adapter module 138.

The enable switch 166 is coupled to both the internal telephone cable 150 and the tone decoder 154 via the bypass relay 198. The position knob 194 of the enable switch 166 has two positions: one is for ETAD functioning and the other is for normal TAD functioning. The enable switch 166 allows the TAD 140 its normal access to the telephone line 26 without having to detach the ETAD adapter module 138 from either of the telephone cables 142 and 210.

When the ETAD function is selected, bypass relay 198 is open and the tone decoder 154 is enabled. The connection between the two cable connectors 144 and 146 via the internal telephone cable 150 is broken by the open bypass relay 198.

When the normal TAD function is selected by the enable switch 166, the enable switch emits or transmits a signal to the bypass relay 198 and to the enable/disable input 164 of the tone decoder 154.

Reception of a signal from the enable switch 166 by the bypass relay 198 closes the bypass relay 198. When the bypass relay 198 is closed, the two telephone cable connectors 144 and 146 are connected via the internal telephone cable 150. Direct signal communications between the telephone line 26 and the coupled TAD 140 are then possible.

Reception of a signal by the enable/disable input 164 of the tone decoder 154 disables the tone decoder 154. It also prevents the tone decoder 154 from monitoring its telephone input 155 for tone signals and prevents tone decoder 154 from responding to such tone signals. This prevents the ring signal generator 178 from emitting any ring signals as the ring signal generator 178 cannot be activated by the disabled tone decoder 154. Disabling the tone decoder 154 when the bypass relay 198 is closed prevents accidental activation of the ring signal generator 178 by tones present on the telephone line 26.

With the enable switch 166, the ETAD module 138 may remain serially connected to the telephone cables 142 and 210, yet allow the connected TAD to normally function when normal access by the TAD 140 to the telephone cables 142 and 210 is desired. Bypass relay 198 also prevents incoming telephone ring signals from activating the connected TAD when the ETAD function is engaged as incoming telephone signals must go through the tone decoder 154 and the ring signal generator 178.

Alternatively, another relay (not shown) controlled by the enable switch 166 may be serially connected between the tone decoder telephone input 155 and the internal telephone cable 150. The second relay would act similarly to a disable/enable input 164 on the tone decoder 154. The enable switch 166 would control the second relay to uniquely enable either ETAD functioning through the tone decoder 154 or regular TAD functioning through the bypass relay 198. The second relay would be closed when the bypass relay 198 was open, and vice-versa.

By means of the ETAD adapter module 138, any conventional TAD may be used in the system as an ETAD. By incorporation of the ETAD module 138 into a TAD, a conventional TAD basically becomes an ETAD 20.

An alternative use may be made of the MTAD-/ETAD system when a ringing telephone is answered by a person who is at home and the caller asks to speak to another person who is currently absent. In that case, the person answering the telephone may simply press the tone codes for the absent person's ETAD 20. As the ETADs 20 of the system are set to detect certain tones, it does not matter whether the tones are generated by the caller or by the person answering the telephone. Once the absent person's ETAD 20 is activated, the person who answered the telephone may hang up, and the caller may still leave a private message for the absent person. The caller is then also assured that his or her message will reach the person who was absent without loss or mistranscription.

Another alternate use of the ETAD is as an "at-home message taker" for leaving messages on the ETAD 20 by one who is at-home. Upon picking up the telephone, the person at home keys the code for the ETAD 20. The dial tone becomes silent with the first tone. The tone decoder 76 of the ETAD 20 detects the tones and triggers the TAD mechanism 86. Upon activation, the ETAD 20 may then play a recorded outgoing message and will record the at-home person's incoming message. When the absent person returns, the message that was left for him has been recorded and preserved on the ETAD.

In an alternative embodiment of the ETAD module 138, a different telephone device, like a FAX machine, is activated instead of a TAD. For example, the ring signal generator that served to activate the TAD is replaced by an activation circuit (not shown) for a local FAX machine (also not shown). This FAX adapter is used when the caller calls a telephone number and receives a FAX tone from the other end. In order for the caller to activate the FAX machine on his local end, all he must do is enter a tone from the telephone's touch tone keypad. The tone detector of the adapter detects the tone and triggers the activation circuit. The activation circuit then transmits a FAX activation tone to the local FAX machine via the telephone line connection. The local FAX then seizes the telephone line and FAX transmission is then possible between the local activated FAX machine and the remote FAX machine (not shown) called by the caller. It is within the contemplation of the invention to incorporate such a FAX activating module into the FAX machine itself.

Similarly, other activation signal generators may be used with and/or incorporated within certain telephone related devices. In this way, almost any number of tone-activated telephone devices may be connected to the telephone line and activated by the means of tones.

While the present invention has been described in regards to the preferred embodiments, it is recognized that other embodiments of the present invention may be employed without departing from the inventive concept. This includes the use of circuitry to expand the number of possible tone codes available for MTAD adapter module and ETAD activation.

What is claimed is:

1. A system of plural telephone answering devices connected to and sharing a signal telephone line wherein:
   a first telephone answering device coupled to said single telephone line, said first telephone answering device detecting incoming ring signals on said single telephone line and becoming active in response thereto;
   an adapter module connected to and between said single telephone line and said first telephone answering device, said adapter module becoming active upon reception of a tone or tone sequence transmitted by said single telephone line, and said adapter module temporarily disconnecting said first telephone answering device from said single telephone line upon reception said tone or tone sequence; and
   a second telephone answering device connected to said single telephone line, said second telephone answering device ignoring ring signals incoming from said single telephone line, said second telephone answering device becoming active upon reception of a tone or tone sequence incoming from said single telephone line, said second telephone answering device is switchably controllable to act as either a first or second telephone answering device.

2. A system of plural telephone answering devices as set forth in claim 1 wherein a functional equivalent of said adapter module is incorporated into said first telephone answering device.

3. The system of plural telephone answering devices connected to a signal telephone line of claim 1, wherein:
   said first and second telephone answering devices are capable of answering said telephone line, transmitting a recorded message over said telephone line, and recording a message from said telephone line.

4. The system of plural telephone answering devices connected to a single telephone line of claim 1, wherein:
   said second telephone answering device is capable of detecting a tone or tone sequence from said connected telephone line, becoming active upon detection of said tone or tone sequence, and recording a message from said single telephone line.

5. The system of plural telephone answering devices connected to a single telephone line as set fort in claim 1, wherein:
   said tone or tone sequence activating said adapter module is also a tone or at least part of a tone sequence that activates another telephone answering device.

6. A shared telephone line answering device connected to a shared telephone line and for recording caller massages, comprising:
   tone detecting means having an input coupled to said telephone line and having an output, said tone detecting means detecting at least one tone present on said signal shared telephone line and responding thereto with an output signal;
   telephone line signal recording means coupled to and capable of being activated by output signals of said tone detecting means, said recording means subsequently recording a signal present on said single shared telephone line;
   a telephone ring signal detecting means having an input coupled to said telephone line and having an output, said ring signal detector means capable detecting at least one ring signal on said single shared telephone line and responding thereto with an output signal; with said telephone ring signal detecting means connected to and capable of activating said telephone line signal recording means; and a first switch coupled to both said tone detecting means and said telephone ring detector means whereby said first switch uniquely selects and enables either sad tone detecting means or said telephone ring detector means to activate said telephone line signal recording means.

7. The shared line telephone answering device as set forth in claim 6, further comprising:

at least one second switch connected to said tone detecting means, said at least one second switch selectably controlling said at least one tone for detection by said tone detecting means.

8. The shared telephone line answering device as set forth in claim 6, wherein said tone detecting means comprises a DTMF decoder.

9. The shared telephone line answering device as set forth in claim 7, further comprising:

a telephone ring signal generator having an input coupled to an output of said tone detecting means and an output coupled to an input of said telephone ring signal detector means, said telephone ring signal generator activated by an output signal of said tone detecting means an in turn activating said telephone ring signal detector means by means of an output signal, whereby said telephone line signal recording means is activated by said telephone ring signal detecting means.

10. A master telephone answering device (MTAD) adapter module for use on a telephone line shared by plural telephone answering devices, said MTAD adapter module comprising:

first connection means for serially connecting said MTAD adapter module to said shared telephone line; second connection means for serially connecting said MTAD adapter module to a master telephone answering device;

tone detecting means having an input coupled to said shared telephone line and having an output, said tone detecting means for detecting a tone or tone sequence on said shared telephone line and responding thereto with an output signal;

a telephone line disconnection means coupled to said output of said tone detecting means, said telephone line disconnection means for temporarily disconnecting said master telephone answering device from said shared telephone line in response to said output signal emitted by said tone detecting means;

a relay connected to said shared telephone line, said relay for temporarily disconnecting said master telephone answering device from said shared telephone line; and a timer having an input coupled to said tone detecting means and having an output coupled to said relay, where upon output response from said tone detecting means, said timer holds said relay open for an adequate length of time to ensure said master telephone answering device disconnection from said shared telephone line and said master telephone answering device reset.

11. The MTAD adapter module of claim 10, in which said tone detecting means comprises a DTMF decoder.

12. The MTAD adapter module of claim 10, in which said telephone line disconnection means further comprises:

a delay circuit coupled by an input to said tone detecting means output and coupled by an output to said timer input, said delay circuit delaying transmission of said output response of said tone detecting means and preventing immediate telephone line disconnection by said relay.

13. The MTAD adapter module of claim 10, further comprising:

at least one switch connected to said tone detecting means, said switch switchably controlling said tone or tone sequence detected by said tone detecting means.

* * * * *